(12) United States Patent
Fukazawa et al.

(10) Patent No.: US 10,489,981 B2
(45) Date of Patent: Nov. 26, 2019

(54) INFORMATION PROCESSING DEVICE, INFORMATION PROCESSING METHOD, AND PROGRAM FOR CONTROLLING DISPLAY OF A VIRTUAL OBJECT

(71) Applicant: SONY CORPORATION, Tokyo (JP)

(72) Inventors: Ryo Fukazawa, Kanagawa (JP); Kuniaki Torii, Kanagawa (JP); Takahiro Okayama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/770,346

(22) PCT Filed: Oct. 24, 2016

(86) PCT No.: PCT/JP2016/081487
§ 371 (c)(1),
(2) Date: Apr. 23, 2018

(87) PCT Pub. No.: WO2017/098822
PCT Pub. Date: Jun. 15, 2017

(65) Prior Publication Data
US 2018/0315246 A1    Nov. 1, 2018

(30) Foreign Application Priority Data

Dec. 10, 2015 (JP) .................... 2015-241166

(51) Int. Cl.
*G06T 19/00* (2011.01)
*G06F 3/01* (2006.01)
*G06K 9/00* (2006.01)

(52) U.S. Cl.
CPC ............ *G06T 19/006* (2013.01); *G06F 3/011* (2013.01); *G06K 9/00671* (2013.01); *G06T 19/00* (2013.01); *G06T 2219/004* (2013.01)

(58) Field of Classification Search
None
See application file for complete search history.

(56) References Cited

U.S. PATENT DOCUMENTS

2015/0015611 A1*  1/2015  Meier .................... G06F 3/011
                                                           345/633

* cited by examiner

*Primary Examiner* — Jeffrey J Chow
(74) *Attorney, Agent, or Firm* — Paratus Law Group, PLLC

(57) ABSTRACT

There is provided an information processing device, an information processing method, and a program, the information processing device including: a display mode selection unit configured to select one display mode from a plurality of display modes in accordance with a first visual field range of a user, a second visual field range included in the first visual field range, and a positional relationship of a real object; and a display control unit configured to control a display of a virtual object on a display unit in accordance with the selected display mode, the virtual object being associated with the real object.

20 Claims, 10 Drawing Sheets

INFORMATION PROCESSING DEVICE, INFORMATION PROCESSING METHOD, AND PROGRAM FOR CONTROLLING DISPLAY OF A VIRTUAL OBJECT

CROSS REFERENCE TO PRIOR APPLICATION

This application is a National Stage Patent Application of PCT International Patent Application No. PCT/JP2016/081487 (filed on Oct. 24, 2016) under 35 U.S.C. § 371, which claims priority to Japanese Patent Application No. 2015-241166 (filed on Dec. 10, 2015), which are all hereby incorporated by reference in their entirety.

TECHNICAL FIELD

The present disclosure relates to an information processing device, an information processing method, and a program.

BACKGROUND ART

In recent years, augmented reality (AR) technology that augments the real environment perceived by people by superimposing additional information (content) on real objects existing in the real world is becoming widely used, and information is being presented using AR technology. The content presented to a user with AR technology can be visualized using virtual objects that take various forms such as text, icons, images, and 3D models. For example, Patent Literature 1 describes AR technology for smoothing interaction between users. Also, Patent Literature 1 describes AR technology that uses a see-through display having a transmissive display unit.

CITATION LIST

Patent Literature

Patent Literature 1: WO 2014/162825

DISCLOSURE OF INVENTION

Technical Problem

However, many see-through displays are can only perform superimposed display in a portion of a range that is visually recognizable and included in a display area viewed from the user (in a second visual field range of the user), of a range in real space that is visually recognizable to the user (a first visual field range of the user). As a result, there were cases where content related to a real object that is in view of the user and is recognized by the user, is unable to be presented to the user, for example. In such cases, the user may not be able to ascertain whether there is content associated with the real object.

Also, on the other hand, there are cases where information regarding a real object in a range that the user cannot see (visually recognize) with his or her eyes is acquired, and as a result, information related to a real object not recognized by the user is presented, which may be confusing for the user.

Therefore, the present disclosure proposes an information processing device, an information processing method, and a program which can present information to a user in accordance with the visual field range of the user and the positional relationship of the real object.

Solution to Problem

According to the present disclosure, there is provided an information processing device including: a display mode selection unit configured to select one display mode from a plurality of display modes in accordance with a first visual field range of a user, a second visual field range included in the first visual field range, and a positional relationship of a real object; and a display control unit configured to control a display of a virtual object on a display unit in accordance with the selected display mode, the virtual object being associated with the real object.

In addition, according to the present disclosure, there is provided an information processing method including: selecting one display mode from a plurality of display modes, in accordance with a first visual field range of a user, a second visual field range included in the first visual field range, and a positional relationship of a real object; and controlling, by a processor, a display of a virtual object on a display unit in accordance with the selected display mode, the virtual object being associated with the real object.

In addition, according to the present disclosure, there is provided a program for causing a computer to realize: a display mode selection function that selects one display mode from a plurality of display modes in accordance with a first visual field range of a user, a second visual field range included in the first visual field range, and a positional relationship of a real object; and a display control function that controls a display of a virtual object on a display unit in accordance with the selected display mode, the virtual object being associated with the real object.

Advantageous Effects of Invention

As described above, according to the present disclosure, it is possible to present information to a user in accordance with the visual field range of the user and the positional relationship of the real object.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
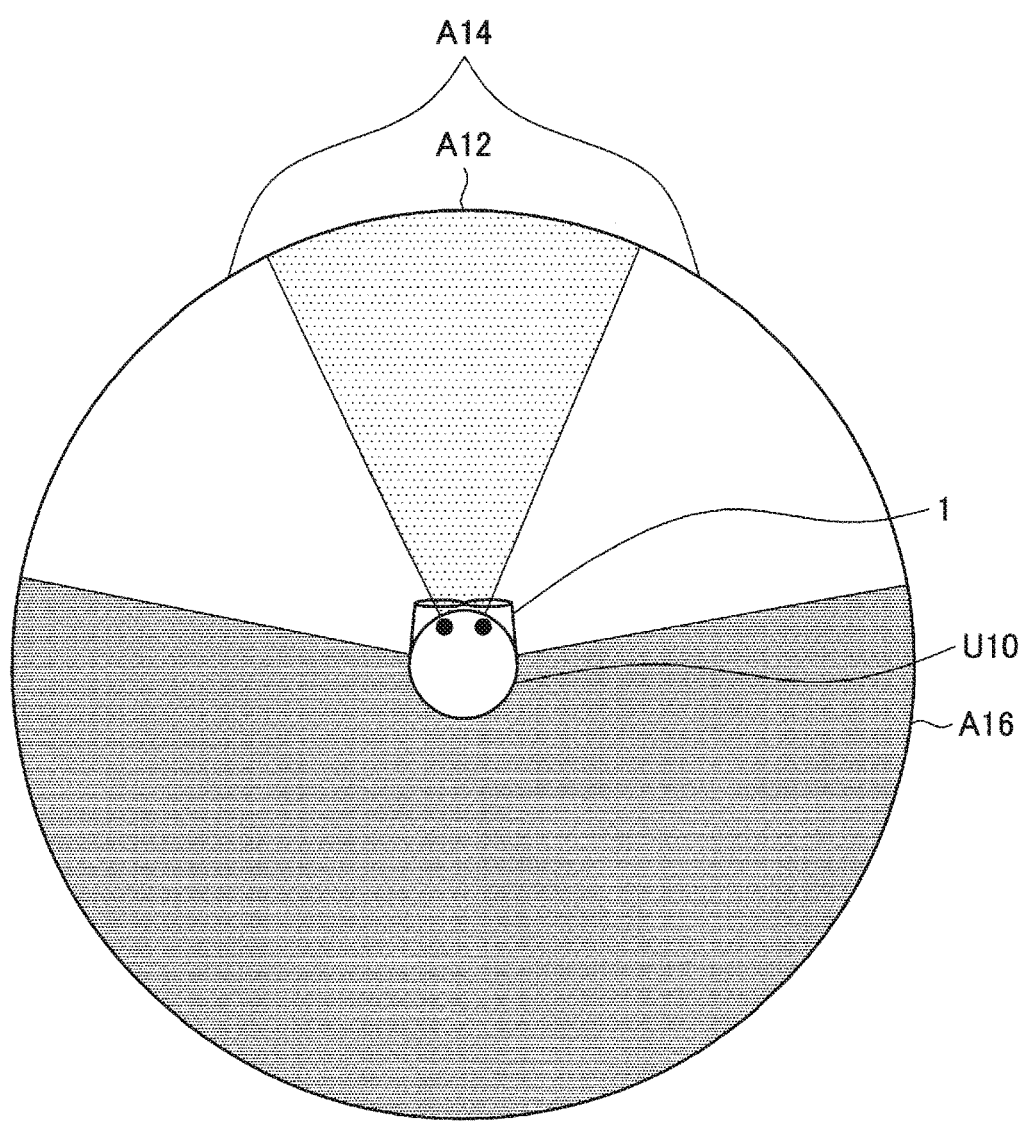
FIG. 1 is an explanatory view illustrating an outline of an information processing device according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish elements that have substantially the same function and structure, the same reference sign alone is attached.

Note that the description will be given in the following order.

<<1. Outline>>
<<2. Configuration>>
<<3. Operation>>
<<4. Specific examples of indications>>
<4-1. First specific example>
<4-2. Second specific example>
<4-3. Third specific example>
<4-4. Fourth specific example>
<4-5. Fifth specific example>
<4-6. Sixth specific example>
<4-7. Seventh specific example>
<4-8. Eighth specific example>
<<5. Modified examples>>
<5-1. Modified example 1>
<5-2. Modified example 2>
<5-3. Modified example 3>
<<6. Hardware configuration example>>
<<7. Conclusion>>

1. Outline

In recent AR technology, a see-through display having a transmissive display unit is often used as a display device. There are cases where it is only possible to perform superimposed display in a portion of a range that is visually recognizable to the user, due to the display area of the see-through display being limited by physical restrictions or the like.

FIG. 1 is an explanatory view illustrating an outline of an information processing device according to an embodiment of the present disclosure. Note that FIG. 1 is a view showing a frame format viewed from above of a user U1 wearing the information processing device 1.

The information processing device 1 illustrated in FIG. 1 is a display device that includes a transmissive display unit (transmissive display). Note that in FIG. 1, an example is illustrated in which the information processing device 1 is an eyeglass-type display device (head mounted display), but the information processing device 1 according to the present embodiment is not limited to an eyeglass-type display device, and may be a helmet-type display device (helmet mounted display). The information processing device 1 can be realized by various modes, such as a transmissive head mounted display or a helmet mounted display (HMD) or a head up display (HUD) that uses the front windshield of a vehicle.

Range A12 illustrated in FIG. 1 is a range where superimposed display by the information processing device 1 is possible, i.e., a range that is included in the display area of the transmissive display unit of the information processing device 1 and that is visually recognizable to the user. For example, the information processing device 1 causes the display unit to display a virtual object, and as a result, the virtual object is superimposed on the real space in the range A12 and is visually recognized by the user. Note that in FIG. 1 an example is illustrated in which the information processing device 1 displays for both eyes of the user, but the information processing device 1 may be a monocular type display device that displays for one eye of the user. In such a case, the user is able to simultaneously recognize both the real space and the information displayed on the display unit visually, and the second visual field range described above is included in the display area of the display unit and is visually recognizable, regardless of whether the display unit of the information processing device is a transmissive display unit or a non-transmissive display unit.

Also, a range A14 illustrated in FIG. 1 is the view of the user, i.e., a range visually recognizable to the user, and the range A12 described above is included in the range A14, as illustrated in FIG. 1. Also, a range A16 illustrated in FIG. 1 is a range not visually recognizable to the user, and is a range outside the range A14. Note that in the description below, the range A14 may be referred to as the first visual field range A14 of the user or the first visual field range A14, and the range A12 may be referred to as the second visual field range A12 of the user or the second visual field range A12.

With AR technology, content associated with a real object (including an object in real space and a specific position in real space and the like) can be visualized using virtual objects that take various forms such as text, icons, images, and 3D models. For example, the information processing device 1 that has recognized a real object specifies the content position (position of the content) for displaying the content associated with the real object, and displays the content at the content position. The content position may be specified on a real space coordinate system or may be specified on a planar coordinate system based upon the display unit of the information processing device 1.

The method by which the information processing device 1 specifies the content position varies depending on the application, but the content position can be specified such that the user is able to visually recognize the content superimposed on the real object or near the real object. However, if the specified content position is outside the second visual field range A12, the information processing device 1 will be unable to present (display) the content to the user due to the limitations of the display area of the display unit.

Here, if the real object is outside the range A12, the content position specified on the basis of the position of the real object can be specified outside the range A12. In such a case, the content will not be presented to the user, and the user will be unable to grasp that there is content associated with the real object.

Therefore, if the position of content specified on the basis of the real object is outside the second visual field range A12, for example, it is possible to make the user aware of the existence of the content by presenting an indication (notification) indicating the existence of the content to the user. However, if a determination is made on the basis of whether the position of the content is outside the second visual field range A12 as described above, an indication can be presented to the user even if the real object is outside the first visual field range A14. In such a case, the user will not be able to visually recognize the real object, so the user will not know what the content is associated with, which may be confusing for the user.

Therefore, the present embodiment was created with the above situation in mind. The information processing device 1 according to the present embodiment is able to make the user aware of the existence of content, without confusing the user, by selecting one display mode from a plurality of display modes, in accordance with the first visual field range and the second visual field range of the user, and the positional relationship of the real object. Hereinafter, the configuration of the information processing device 1 according to the present embodiment that realizes the above effects will be described.

2. Configuration

Figure 2:
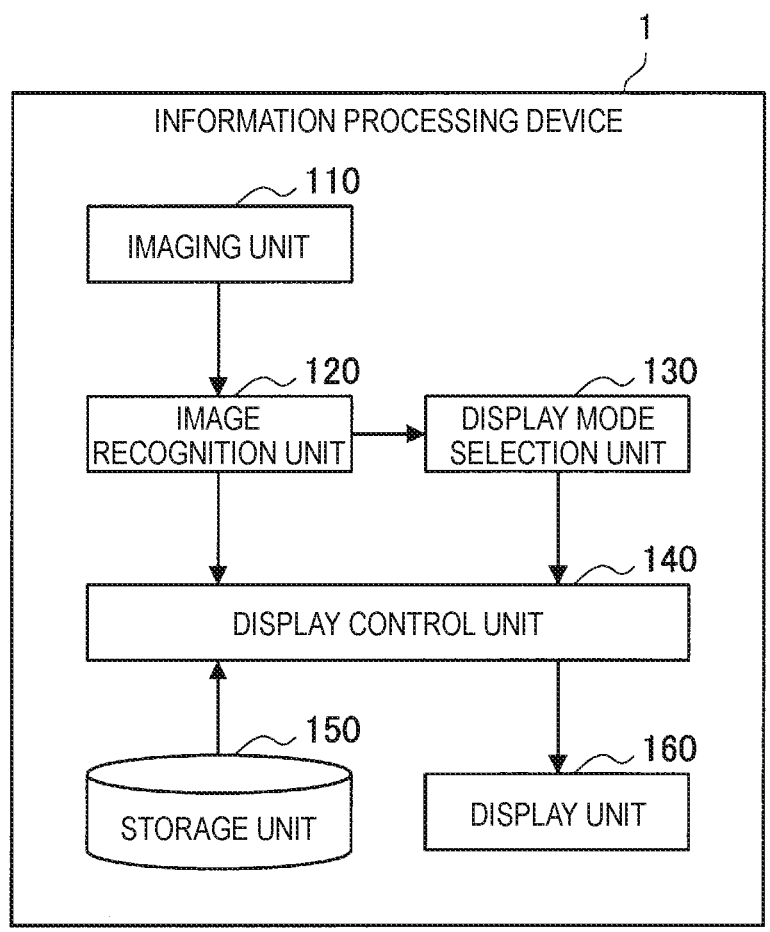
FIG. 2 is block diagram illustrating a configuration of the information processing device 1 according to the embodiment.

Heretofore, an outline of the image processing system 1 according to the present embodiment is described. Continuing on, the configuration of the information processing device 1 according to the one embodiment of the present disclosure will be described with reference to FIG. 2. FIG. 2 is block diagram illustrating a configuration of the information processing device 1 according to the present embodiment. As illustrated in FIG. 1, the information processing device 1 includes an imaging unit 110, an image recognition unit 120, a display mode selection unit 130, a display control unit 140, a storage unit 150, and a display unit 160.

The imaging unit 110 is a camera module that acquires an image. The imaging unit 110 acquires a captured image by capturing real space using an imaging element such as a charge coupled device (CCD) or a complementary metal oxide semiconductor (CMOS). The captured image acquired by the imaging unit 110 is provided to the image recognition unit 120.

The imaging unit 110 of the present embodiment is preferably able to capture a range that is wider than a range visually recognizable to a user wearing the information processing device 1 (wider than the first visual field range A14 described with reference to FIG. 1). For example, the imaging unit 110 may be realized by one imaging element that has an angle of view capable of capturing a range wider than the first visual field range A14, or may be realized by a plurality of imaging elements so as to be able to capture a range wider than the first visual field range A14 by a plurality of captured images. For example, the imaging unit 110 may be an omni-directional camera that is realized by a plurality of imaging elements.

Also, the imaging unit 110 may be a stereo camera that has a plurality of imaging elements and simultaneously acquires a plurality of images. In such a case, the plurality of imaging elements are lined up horizontally, and are thus able to acquire three-dimensional shape information (depth information) regarding real space, by an image recognition unit 120 that will be described later analyzing the plurality of acquired images using a stereo matching method or the like.

The image recognition unit 120 analyzes the captured image acquired by the imaging unit 110, and recognizes the three-dimensional shape of real space and a real object in the real space. The real object that the image recognition unit 120 recognizes may be a building, a specific shape, or a marker (e.g., texture information of a specific pattern, or a collection of image feature point information, expressed by a two-dimensional code or the like), or the like.

For example, the image recognition unit 120 may recognize the three-dimensional shape of real space and acquire three-dimensional information, by applying a stereo matching method to a plurality of images acquired simultaneously, or applying a structure from motion (SfM) method or SLAM method to a plurality of images acquired in temporal sequence. Also, the image recognition unit 120 may recognize a real object in real space and acquire information regarding the real object (real object information) by matching feature point information detected from the captured image to feature point information prepared beforehand. The information regarding the real object may include the position of the real object (the position on a real space coordinate system, or the position on a planar coordinate system based on the display unit 160).

Note that the three-dimensional shape information acquired by the image recognition unit 120 is provided to the display control unit 140. Also, the real object information acquired by the image recognition unit 120 is provided to the display mode selection unit 130 and the display control unit 140.

The display mode selection unit 130 selects one display mode from a plurality of display modes on the basis of the real object information provided by the image recognition unit 120. A virtual object associated with the real object is displayed on the display unit 160, described later, by the display control unit 140, described later, controlling the display in accordance with the display mode selected by the display mode selection unit 130.

For example, the display mode selection unit 130 selects one display mode from the plurality of display modes, in accordance with the first visual field range A14 of the user described with reference to FIG. 1, the second visual field range A12 included in the first visual field range A14, and the positional relationship of the real object.

The first visual field range A14 that is a range visually recognizable to the user may be obtained as a range included in the human viewing angle centered around the user, for example. A predetermined value, for example, may be used as the human viewing angle, or the human viewing angle may be obtained by the user inputting the human viewing angle using an operating portion, not shown, or the like. Also, the second visual field range A12 that is a range visually recognizable to the user and included in the display area of the display unit 160 may be obtained as a range included in the display viewing angle of the display unit 160, centered on the user, for example. In such a case, the display viewing angle may be a value that is measured or set in advance, or may be calculated on the basis of the distance between the display unit 160 and an eye of the user sensed by a distance sensor or the like, not shown.

For example, in a case where a real object is in the second visual field range A12 that is included in the first visual field range A14, for example, the display mode selection unit 130 may select a display mode in which content associated with the real object is displayed. According to such a configuration, in a case where a real object is in a range that is in the user's field of view (the first visual field range A14) and where superimposed display is possible (in second visual field range A12), the user is able to visually recognize additional information (content) related to the real object, for example.

Also, in a case where a real object is in the first visual field range A14 but is not in the second visual field range A12, the display mode selection unit 130 may select a display mode in which an indication indicating the existence of content associated with a real object is displayed. According to such a configuration, even if a real object that is in the user's field of view is outside the range where superimposed display is possible, such that no content is displayed, the user is able to grasp that content associated with the real object exists. Note that specific examples of indications will be described later with reference to FIG. 5 and FIG. 7 to FIG. 16.

Also, in a case where a real object is outside the first visual field range A14, the display mode selection unit 130 may select a display mode in which a virtual object associated with the real object will not be displayed. Note that even in such a case, a virtual object associated with another real object may be displayed.

If an indication or content associated with a real object not within the user's field of view ends up being displayed, the user will not know what the content is associated with, which may be confusing for the user. However, according to the configuration described above, an indication or content associated with a real object not within the user's field of view will not be displayed, which makes it possible to avoid the user becoming confused as described above.

Note that in the present disclosure, a real object being in the first or second visual field range may mean that the entirety or a portion of the real object is in the first or second visual field range. Also, in the present disclosure, a real object being outside the first or second visual field range may mean that the entirety or a portion of the real object is outside the first or second visual field range.

The display control unit 140 controls the display unit 160 to cause a variety of information to be displayed. For example, the display control unit 140 controls the display of a virtual object associated with a real object on the display unit 160, in accordance with a display mode selected by the display mode selection unit 130.

The display control unit 140 may cause content to be displayed as a virtual object, or may cause an indication to be displayed as a virtual object, in accordance with the selected display mode. Also, the display control unit 140 may cause a virtual object to not be displayed, in accordance with the selected display mode.

Also, information regarding indications, and content that the display control unit 140 causes to be displayed as a virtual object, may be stored in the storage unit 150 and supplied to the display control unit 140. Also, the display control unit 140 may specify content associated with a real object from content stored in the storage unit 150, on the basis of information regarding the real object.

Also, in a case where content is displayed as a virtual object, the display control unit 140 may specify the content position (the position of content) for displaying the content, on the basis of a real object, and cause the content to be displayed at the content position. Note that the display control unit 140 may specify the content position further on the basis of three-dimensional shape information, or may specify the content position further on the basis of the information regarding the content. Note that the method by which the content position is specified varies depending on the application, but any well-known method in AR technology may be used.

The storage unit 150 stores information regarding content and information regarding indications. Content relating to information regarding the content stored in the storage unit 150 may include, for example, text data, images, 3D models, effects, markings, silhouettes, game characters, and items in games, and the like.

Also, the information regarding content stored in the storage unit 150 may include information for specifying the content position that causes the content to be displayed. For example, in a case where the content is an effect that causes a real object to be emphasized, information for specifying the content position so that the content will be displayed superimposed on the real object may be included in information regarding the content. Also, in a case where the content is text data related to a real object, information for specifying the content position so that the content will be displayed not overlapping with content near the real object may be included in information regarding the content.

The display unit 160 is a transmissive (see-through) optical see-through display that displays a virtual object. The display unit 160 may be a component that displays an image reflected using hologram optical element or a half mirror or the like, or may be a component that displays an image by illuminating light at the user's retina, for example.

As described above, the second visual field range A12 is a range that is visually recognizable to the user and included in the display area of the display unit 160. That is, the second visual field range A12 is also a display area of the display unit 160 from the user's point of view, so hereinafter the range A12 may also be referred to as display area A12.

3. Operation

Figure 3:
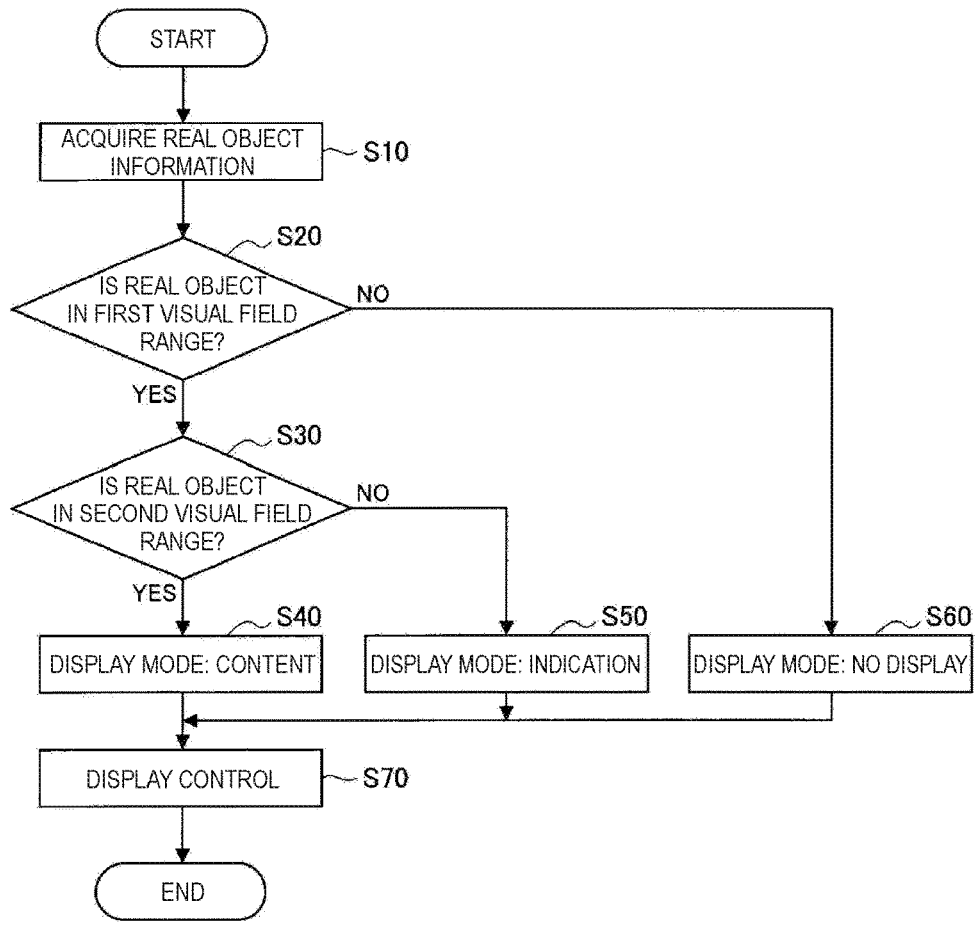
FIG. 3 is flowchart illustrating an example of operation of the information processing device 1 according to the embodiment.

Heretofore, a configuration example of the information processing device 1 according to an embodiment of the present disclosure is described. Next, an example of operation of the information processing device 1 according to the present embodiment, in particular, a process according to the selection of the display mode, will be described with reference to FIG. 3 to 6. FIG. 3 is flowchart illustrating an example of operation of the information processing device 1 according to the present embodiment.

First, the image recognition unit 120 analyzes the captured image acquired by the imaging unit 110, and acquires real object information (S10). Next, the display mode is selected by the display mode selection unit 130 on the basis of the real object information (S20 to S60).

Figure 4:
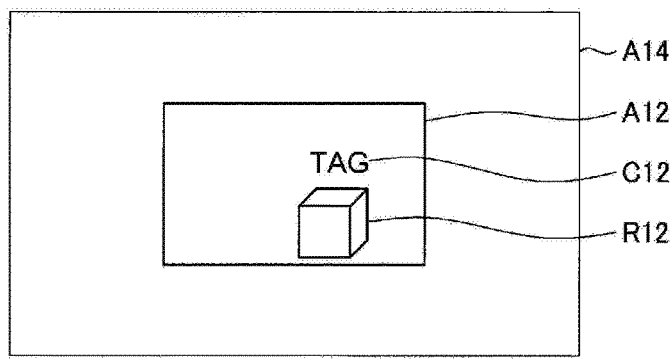
FIG. 4 is an explanatory view illustrating selection of a display mode in step S40 illustrated in FIG. 3.

FIG. 4 is an explanatory view illustrating selection of the display mode in step S40 illustrated in FIG. 3. In a case where a real object R12 is in the first visual field range A14 and is also in the second visual field range A12 (YES in S20 and YES in S30), a display mode in which content C12 associated with the real object will be displayed is selected (S40).

Figure 5:
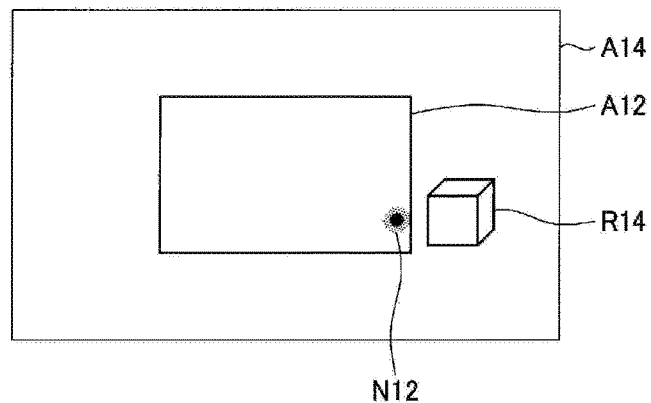
FIG. 5 is an explanatory view illustrating selection of a display mode in step S50 illustrated in FIG. 3.

Also, FIG. 5 is an explanatory view illustrating selection of the display mode in step S50 illustrated in FIG. 3. In a case where the real object R14 is in the first visual field range A14 but is outside the second visual field range A12 (YES in S20 and NO in S30), a display mode in which an indication N12 indicating the existence of content will be displayed is selected (S50). Note that in FIG. 5, a circular light is shown as an example of an indication, but the indication according to the present embodiment is not limited to this example. Detailed examples of indications according to the present embodiment will be described later with reference to FIGS. 7 to 16.

Figure 6:
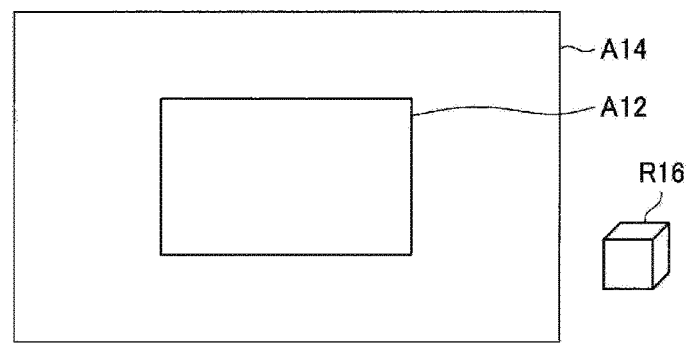
FIG. 6 is an explanatory view illustrating selection of a display mode in step S60 illustrated in FIG. 3.

Also, FIG. 6 is an explanatory view illustrating selection of the display mode in step S60 illustrated in FIG. 3. In a case where a real object R16 is outside the first visual field range A14, (NO in S20), a display mode in which a virtual object associated with the real object will not be displayed, as illustrated in FIG. 6, is selected (S60).

The description will now continue returning to FIG. 3. After the display mode has been selected by the display mode selection unit 130, display control of the display unit 160 is performed by the display control unit 140 in accordance with the selected display mode (S70).

Note that the processes of steps S10 to S70 described above may be repeated as needed or at regular intervals. Also, in step S10, in a case where information regarding a plurality of real objects is acquired, the display control process (S70) may be performed after the display mode selection process (S20 to S60) has been performed for each of the real objects.

4. Specific Examples of Indications

Heretofore, the configuration and operation of the information processing device 1 according to the present embodiment is described. Below, several specific examples of indications displayed on the display unit 160 in a case where a real object is in the first visual field range A14 but is outside the second visual field range A12 (YES in S20 and NO in S30 illustrated in FIG. 3) will be described.

Note that the information processing device 1 according to the present embodiment may display any one indication, or may display a plurality of indications in combination, of the indications described in the specific examples described below. Also, an indication that has been set in advance may be displayed, an indication selected from a plurality of indications by input by the user may be displayed, or an indication specified by the display control unit 140 in accordance with the content may be displayed.

4-1. First Specific Example

Figure 7:
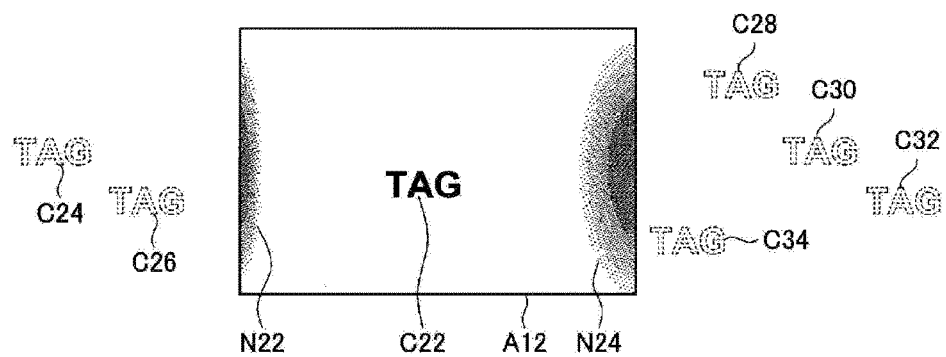
FIG. 7 is an explanatory view illustrating a first specific example of an indication according to the embodiment.

FIG. 7 is an explanatory view illustrating a first specific example of an indication according to the present embodiment. As illustrated in FIG. 7, content C22 and indications N22 and N24 are displayed in the display area A12 of the display unit 160 in the present specific example.

The content C22 is a virtual object that is displayed when a display mode in which content is to be displayed is selected (S40) in the display mode selection process illustrated in FIG. 3. On the other hand, the indications N22 and N24 are virtual objects that are displayed when a display mode in which an indication is to be displayed is selected (S50) in the display mode selection process illustrated in FIG. 3.

The indications N22 and N24 may be displayed at positions corresponding to the positions of content whose existence is indicated by the indications, at peripheral edge portions of the display area A12 of the display unit 160, as illustrated in FIG. 7.

In the example illustrated in FIG. 7, the indication N22 displayed at the left side peripheral edge portion of the display area A12 is positioned on the left outer side of the display area A12, and indicates the existence of non-displayed content C24 and C26 on the display unit 160. Also, similarly, in the example illustrated in FIG. 7, the indication N24 displayed at the left side peripheral edge portion of the display area A12 is positioned on the right outer side of the display area A12, and indicates the existence of non-displayed content C28 to C34 on the display unit 160. Note that each content C24 to C34 indicates content associated with real objects that are within the first visual field range A14 but outside the second visual field range A12. Also, in the example illustrated in FIG. 7, the content positions of the content C24 to C34 specified by the display control unit 140 are also outside the second visual field range (display area) A12, so the content C24 to C34 is not displayed on the display unit 160.

According to such a configuration, the user is able to grasp which side of the display area non-displayed content whose existence is indicated by the indication is on.

Also, the indication according to the present specific example may be displayed under a display condition according to the number of pieces of content whose existence is indicated by the indication. The display condition according to the present specific example may include the intensity (e.g., the intensity of light in a case where the indication is light), luminance, color, number, and size and the like of the indication, for example.

In the example illustrated in FIG. 7, the indications N22 and N24 are each displayed under a display condition that increases the size of the indications N22 and N24 according to the number of real objects associated with the content whose existence is indicated by the indications N22 and N24. According to such a configuration, the user is able to estimate the number of pieces of non-displayed content whose existence is indicated by the indications.

4-2. Second Specific Example

Figure 8:
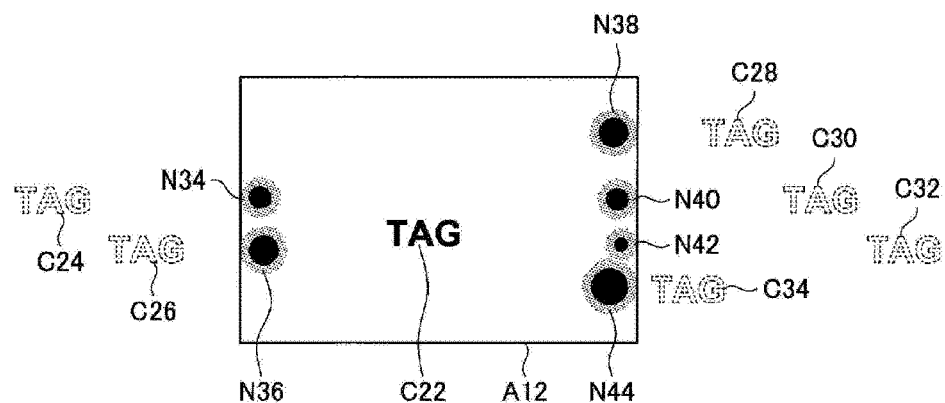
FIG. 8 is an explanatory view illustrating a second specific example of an indication according to the embodiment.

FIG. 8 is an explanatory view illustrating a second specific example of an indication according to the present embodiment. In the present specific example, content C22 and indications N34 to N44 are displayed in the display area A12 of the display unit 160.

The indications N34 to N44 according to the present specific example indicate the existence of content C24 to C34, respectively, and are displayed with the number of indications corresponding to the number of pieces of content (one example of a display condition), as illustrated in FIG. 8. According to such a configuration, the user is able to more clearly grasp the number of pieces of content whose existence is indicated by the indications.

Also, the indications N34 to N44 according to the present specific example are displayed at positions corresponding to the positions of the content C24 to C34, respectively, as illustrated in FIG. 8. According to such a configuration, the user is able to estimate the positions of non-displayed content whose existence is indicated by the indications.

Moreover, the indications according to the present specific example may be displayed under a display condition according to distance. For example, in a case where the content position is specified with a real space coordinate system, the distance may be the distance from the user to the content position. Also, in a case where the content position is specified with a planar coordinate system based on the display unit 160, the distance may be the distance from the display area of the display unit 160 to the position of the content.

For example, the indications N34 to N44 illustrated in FIG. 8 are displayed under a display condition that reduces the size of the indications N34 to N44 according to the distance from the display area A12 to the positions of the content C24 to C34 whose existence is indicated by each of the indications. According to such a configuration, the user is able to more accurately estimate the positions of non-displayed content whose existence is indicated by the indications.

4-3. Third Specific Example

In the second specific example described above, the size of an indication is used as an example of the display condition according to distance, but the display condition according to distance according to the present embodiment is not limited to the size of the indication. Below, an example in which an indication is displayed under another display condition according to distance will be described as a third specific example.

Figure 9:
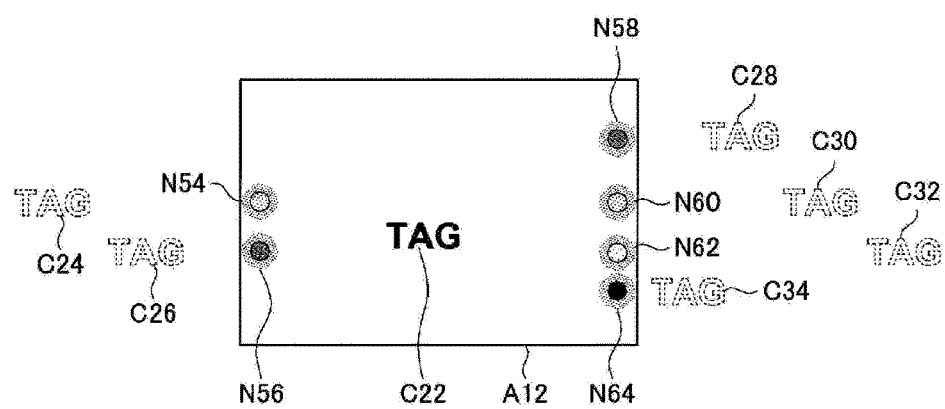
FIG. 9 is an explanatory view illustrating a third specific example of an indication according to the embodiment.

FIG. 9 is an explanatory view illustrating the third specific example of an indication according to the present embodiment. In the present specific example, content C22 and indications N54 to N64 are displayed in the display area A12 of the display unit 160.

Similar to the second specific example described with reference to FIG. 8, the indications N54 to N64 according to the present specific example indicate the existence of content C24 to C34, respectively, and are displayed with the number of indications corresponding to the number of pieces of content (one example of a display condition). Also, similar to the second specific example, the indications N54 to N64 according to the present specific example are displayed at positions corresponding to the positions of the content C24 to C34, respectively.

For example, the indications N54 to N64 illustrated in FIG. 9 are displayed with luminances corresponding to the distance from the display area A12 to the positions of the content C24 to C34 whose existence is indicated by each of the indications (one example of a display condition). According to such a configuration, the user is able to estimate the positions of non-displayed content whose existence is indicated by the indications, by the display condition.

Note that the display condition according to distance according to the present embodiment is not limited to the size and luminance of an indication described above, and may be the intensity, luminance, or number or the like of an indication.

4-4. Fourth Specific Example

Figure 10:
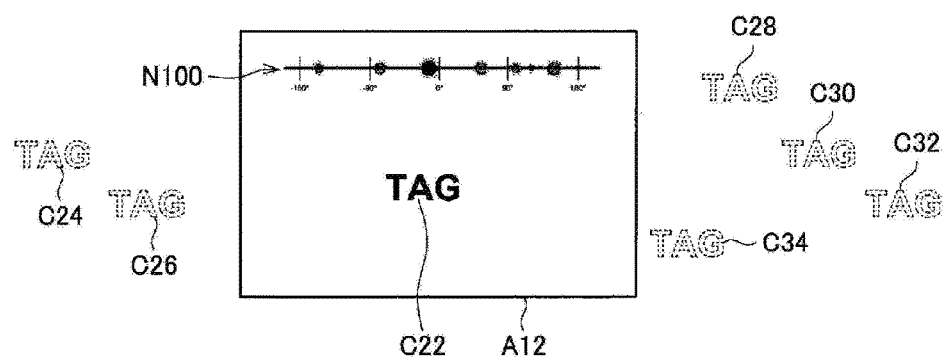
FIG. 10 is an explanatory view illustrating a fourth specific example of an indication according to the embodiment.
Figure 11:
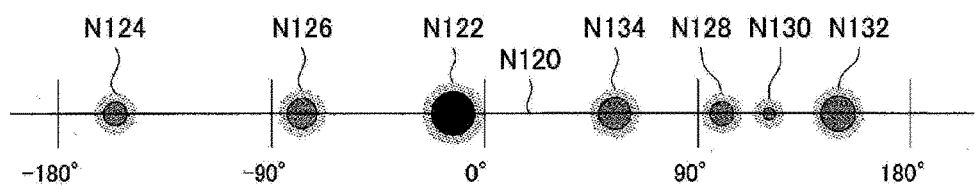
FIG. 11 is an enlarged view of an indication N100 illustrated in FIG. 10.

FIG. 10 is an explanatory view illustrating a fourth specific example of an indication according to the present embodiment. In the present specific example, content C22 and an indication N100 are displayed in the display area A12 of the display unit 160. FIG. 11 is an enlarged view of the indication N100 illustrated in FIG. 10.

As illustrated in FIG. 11, the indication N100 includes an indication N120 indicating a bearing axis based on the user (as viewed from the user), and indications N124 to N134 indicating the existence of content C22 to C34 illustrated in FIG. 10, and the bearings from the user toward the positions of the content C22 to C34. According to such a configuration, the user is able to easily grasp the bearing from himself or herself toward the position of the content.

Note that as illustrated in FIGS. 10 and 11, the indication N100 according to the present specific example may include an indication N122 indicating the existence of the content C22 displayed in the display area A12, and the bearing from the user toward the position of the content C22. Also, the indication N122, and the indications 124 to N134 related to the content C24 to C34 not displayed in the display area A12 may be displayed with different luminances or colors or the like as illustrated in FIG. 11. According to such a configuration, the user is able to grasp the difference between an indication related to content being displayed and an indication related to content not being displayed.

Also, the indications N122 to S134 according to the present specific example may be displayed under a display condition according to distance, similar to the indications according to the second specific example described with reference to FIG. 8. Also, the indications N122 to N134 according to the present specific example may be displayed under a display condition according to the size of the content.

4-5. Fifth Specific Example

Figure 12:
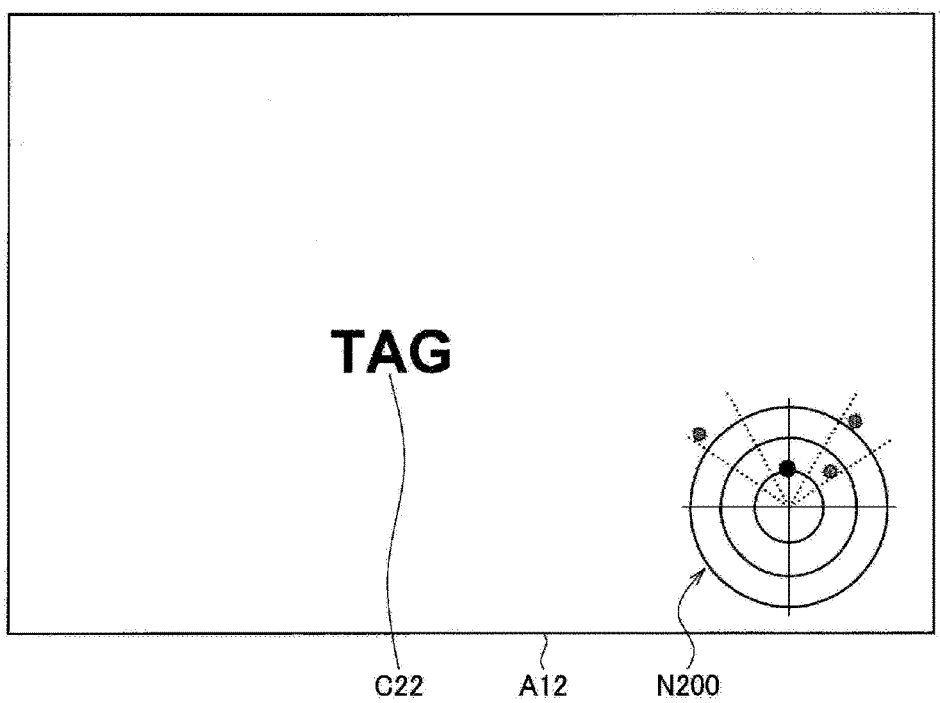
FIG. 12 is an explanatory view illustrating a fifth specific example of an indication according to the embodiment.
Figure 13:
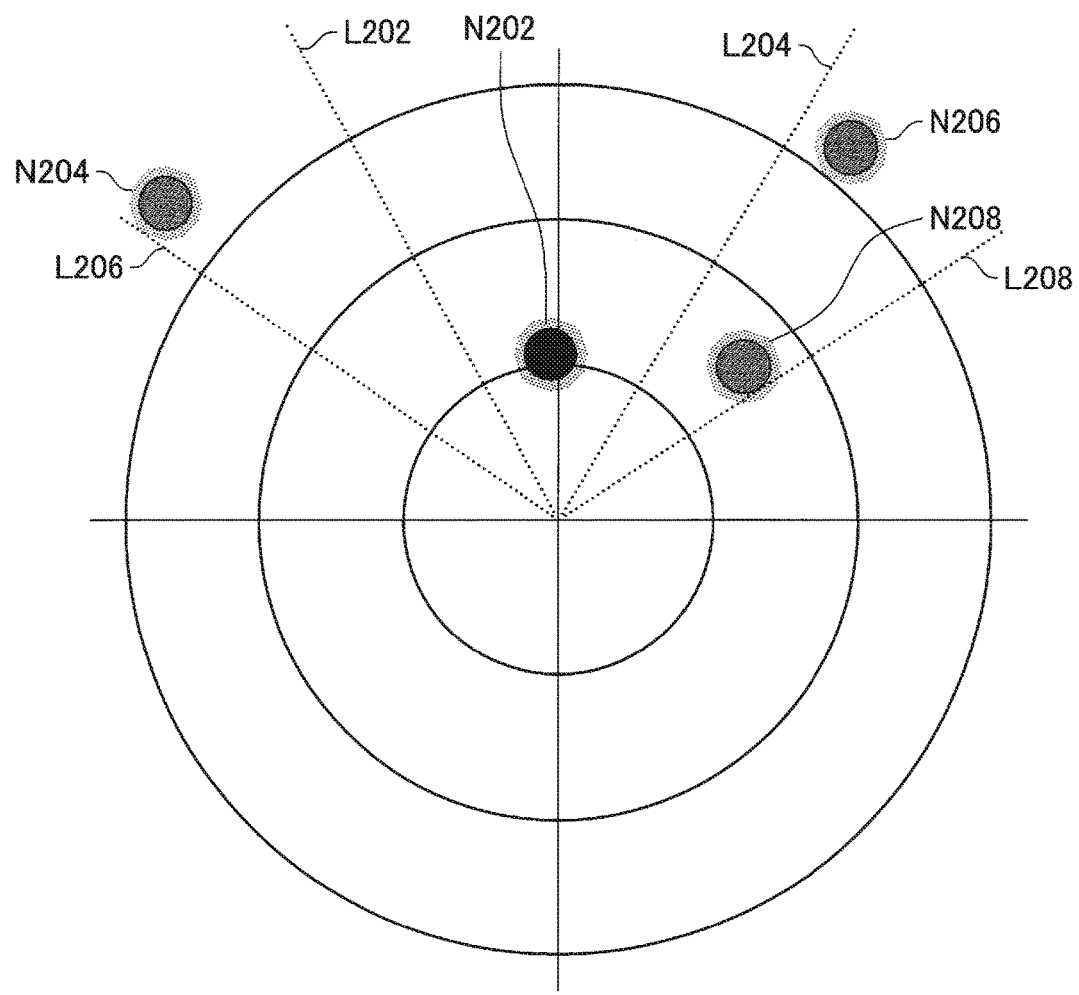
FIG. 13 is an enlarged view of an indication N200 illustrated in FIG. 12.

FIG. 12 is an explanatory view illustrating a fifth specific example of an indication according to the present embodiment. In the present specific example, content C22 and an indication N200 are displayed in the display area A12 of the display unit 160. FIG. 13 is an enlarged view of the indication N200 illustrated in FIG. 12.

As illustrated in FIG. 13, the indication N200 includes indications N202 to N214 indicating the existence of content (content other than the content C22 is not shown) and the relative positions of the content viewed from the user, and dotted lines L202 to L208 indicating the visual field range. The range between the dotted line L202 and the dotted line L204 indicates the display area (second visual field range) A12, and the range between the dotted line L206 and the dotted line L208 indicates a superimposition displayable range (first visual field range A14).

Note that the indication N202 illustrated in FIG. 13 indicates the existence of the content C22 being displayed in the display area A12 illustrated in FIG. 12, and the relative position viewed from the user. The indication N202, and the indications N204 to N208 indicating the existence of content not being displayed in the display area A12 and the relative positions viewed from the user, may be displayed with different luminances or colors or the like as illustrated in FIG. 13. According to such a configuration, the user is able to grasp the difference between an indication related to content being displayed and an indication related to content not being displayed.

4-6. Sixth Specific Example

Figure 14:
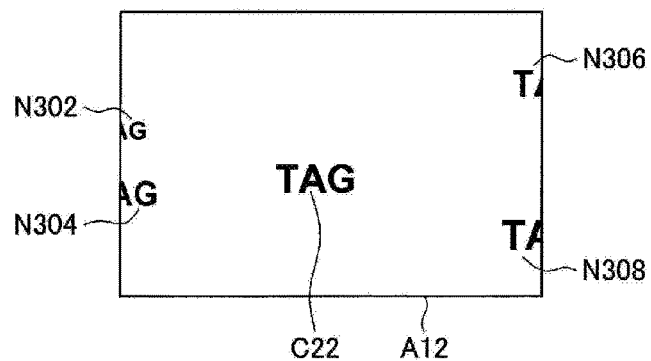
FIG. 14 is an explanatory view illustrating a sixth specific example of an indication according to the embodiment.

FIG. 14 is an explanatory view illustrating a sixth specific example of an indication according to the present embodiment. In the present specific example, content C22 and indications N302 to N308 are displayed in the display area A12 of the display unit 160.

As illustrated in FIG. 14, the indications N302 to N308 according to the present specific example may include a portion of content (not shown) whose existence is indicated by the indications N302 to N308, and may be displayed sticking out from the peripheral edge portions of the display area A12. According to such a configuration, the user is able to estimate the shape, type, or characteristics or the like of the content from the indication including a portion of the content.

4-7. Seventh Specific Example

Figure 15:
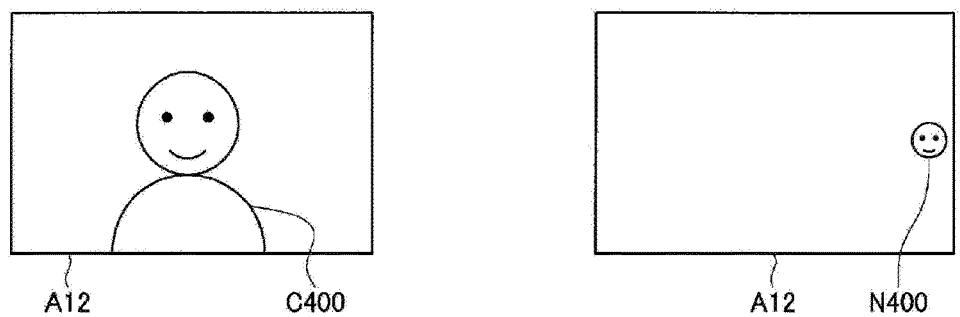
FIG. 15 is an explanatory view illustrating a seventh specific example of an indication according to the embodiment.

FIG. 15 is an explanatory view illustrating a seventh specific example of an indication according to the present embodiment. On the left in FIG. 15, content C400 that is a human character is displayed in the display area A12 of the display unit 160. On the right in FIG. 15, a real object associated with the content C400 exists outside the display area A12, and an indication N400 indicating the existence of the content C400 is displayed in the display area A12 of the display unit 160.

As with the indication N400 illustrated in FIG. 15, the indication according to the present specific example may include an icon indicative of content. The icon according to the present specific example may be a simplified image or symbol of the content, for example. According to such a configuration, the user is able to grasp the approximate form, type, or characteristics or the like of the content from the indication including an icon indicative of the content.

4-8. Eighth Specific Example

Figure 16:
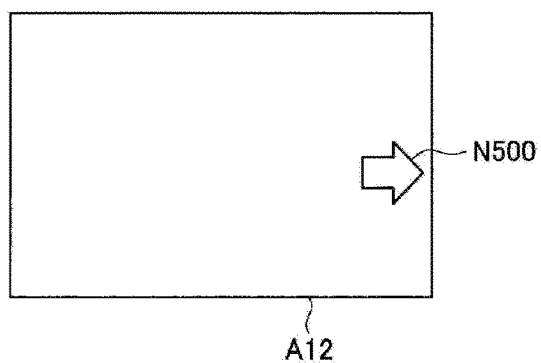
FIG. 16 is an explanatory view illustrating an eighth specific example of an indication according to the embodiment.

FIG. 16 is an explanatory view illustrating an eighth specific example of an indication according to the present embodiment. In the present specific example, an indication N500 indicating non-displayed content, not shown, and the direction from the user toward the position of the content is displayed in the display area A12 of the display unit 160. The indication according to the present specific example may be an arrow such as the indication N500 illustrated in FIG. 16.

According to such a configuration, the user's line of sight is guided by an indication indicating the direction toward the position of content, such as an arrow, which has an effect of making it easier for the user to direct his or her line of sight in that direction, and makes it easier for the content to be displayed.

5. Modified Examples

Heretofore, an embodiment of the present disclosure has been described. Several modified examples of the embodiment will be described below. The modified examples described below may be applied individually or in combination to the present embodiment. Also, each of the modified examples may be applied instead of, or in addition to, the configuration described in the present embodiment.

5-1. Modified Example 1

Figure 17:
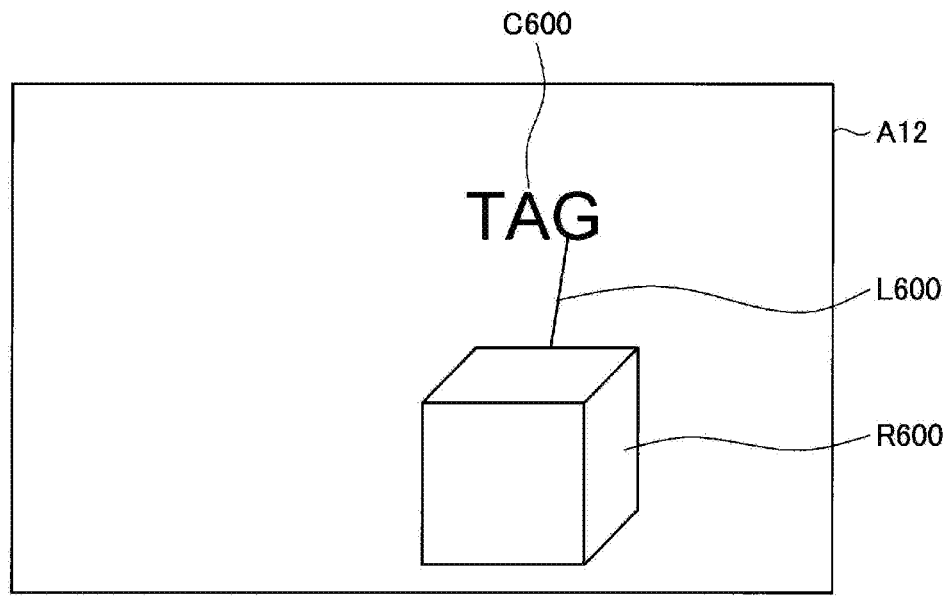
FIG. 17 is an explanatory view illustrating a modified example 1 according to the embodiment.
Figure 18:
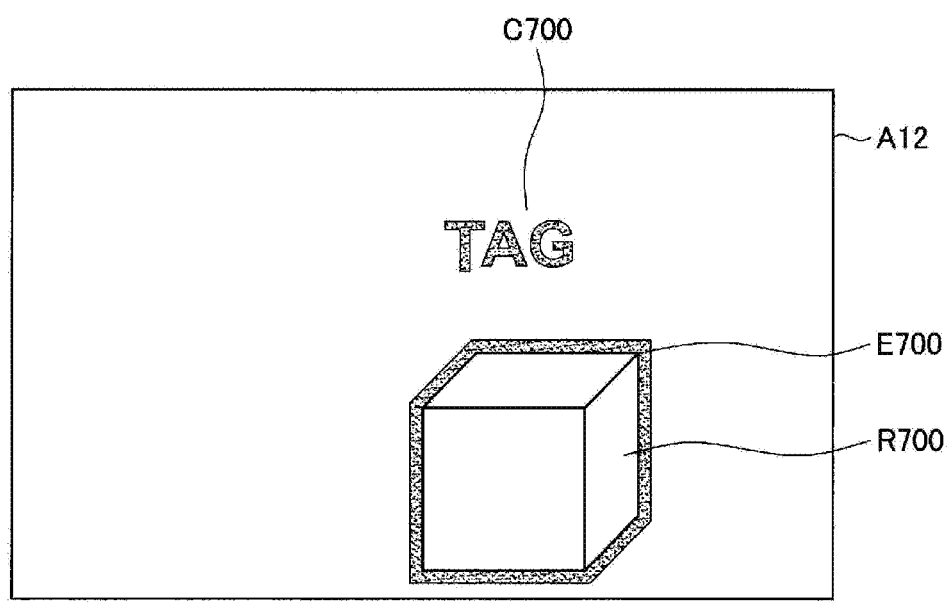
FIG. 18 is an explanatory view illustrating the modified example 1 according to the embodiment.

FIG. 4 of the embodiment described above illustrates an example in which content C12 associated with a real object R12 is displayed as a virtual object near the real object R12, but the present embodiment is not limited to this. For example, a calculation that further clarifies the relationship between a real object and content may be performed. Below, as a modified example 1, an example in which a calculation that further clarifies the connection between a real object and content is performed will be described with reference to FIGS. 17 and 18. FIGS. 17 and 18 are explanatory views illustrating the present modified example.

For example, the connection may be clarified by connecting a real object and content by a line as illustrated in FIG. 17. As illustrated in FIG. 17, content C600 associated with a real object R600, and a line segment L600 for clarifying the connection between the real object R600 and the content C600, may be displayed in the display area A12 according to the present modified example. The line segment L600 may clarify the connection between the real object R600 and the content C600 by being displayed so as to connect the real object R600 with the content C600, as illustrated in FIG. 17.

Also, the connection between a real object and content may be clarified by coloring as illustrated in FIG. 18. As illustrated in FIG. 18, content C700 associated with a real object R700, and an effect E700 for clarifying the connection between the real object R700 and the content C700, may be displayed in the display area A12 according to the present modified example. As illustrated in FIG. 18, the effect E700 may clarify the connection between the real object R700 and the content C700 by being displayed around the real object R700) in the same color as the content C700.

According to such a configuration, the connection between the real object and the content becomes clearer, so the user can easily grasp the connection between the real object and the displayed content.

5-2. Modified Example 2

Also, in the foregoing embodiment, an example is described in which a predetermined value is used for the human viewing angle for obtaining the first visual field range, or the human viewing angle for obtaining the first visual field range is obtained by input by the user, but the present disclosure is not limited to this example. For example, the information processing device 1 may include a sensor, and the human viewing angle may be specified on the basis of the situation of the user, or the situation around the user, obtained by sensing. The information processing device 1 may include a variety of sensors such as a microphone, a global positioning system (GPS) sensor, an acceleration sensor, a visual (such as gaze, point of regard, focal point, or blink) sensor, a biological information (such as heart rate, body temperature, blood pressure, or brain wave) sensor, a gyro sensor, or an illuminance sensor, for example.

For example, according to the sensing effect, a small value may be specified as the human viewing angle in a case where it is detected that the user's rate of movement is fast or the area around the user is crowded (there are many real objects around the user).

According to such a configuration, the human viewing angle is able to be specified with higher accuracy, for example, it is possible to present the user with information that will not be likely to confuse the user, on the basis of the user's situation and the situation around the user.

5-3. Modified Example 3

Also, in the embodiment described above, an example is described in which the information processing device 1 includes the imaging unit 110, and real object information is acquired by image recognition based on a captured image acquired by the imaging unit 110, but the present disclosure is not limited to this example.

For example, a captured image may be acquired by an imaging unit provided in another device, or a surveillance camera or the like installed on a street, and provided to the information processing device 1 over a network or the like. Also, real object information may be acquired by a method using an infrared sensor, a magnetic sensor, radar, or an ultrasonic sensor or the like instead of, or in addition to, the method using image recognition. Further, in an application (for example, a map application or the like) in which content is associated with a predetermined position in real space, the position acquired by a GPS sensor or the like may be handled as a real object according to the present embodiment, and the process described above may be performed.

Also, in a case where the angle of view that can be captured by the imaging unit 110 provided in the information processing device 1 is smaller than the human viewing angle, the image recognition unit 120 may recognize the three-dimensional shape of the surroundings on the basis of a plurality of captured images acquired by the imaging unit 110. For example, the image recognition unit 120 can recognize the three-dimensional shape of real space by applying a structure from motion (SfM) method or SLAM method or the like to a plurality of captured images acquired in temporal sequence.

6. Hardware Configuration Example

Heretofore, each embodiment of the present disclosure has been described. Information processing such as the display mode selection process and the display control process described above is realized through the cooperation of software, and the hardware of the information processing device 1 described below.

Figure 19:
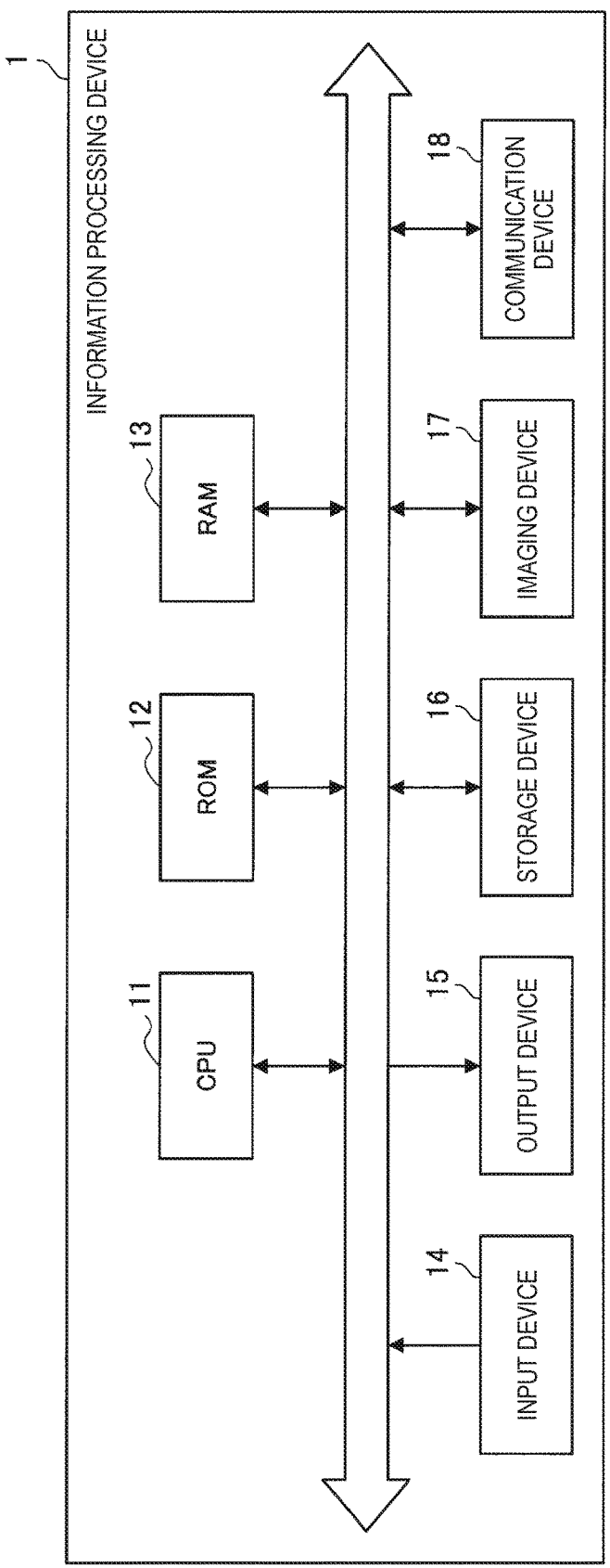
FIG. 19 is an explanatory view illustrating an example of a hardware configuration of an information processing device according to the present disclosure.

FIG. 19 is an explanatory diagram illustrating an example of a hardware configuration of the information processing device 1. As shown in FIG. 19, the information processing device 1 includes a central processing unit (CPU) 11, a read only memory (ROM) 12, a random access memory (RAM) 13, an input device 14, an output device 15, a storage device 16, an imaging device 17, and a communication device 18.

The CPU 11 functions as an operation processing device and a control device, and controls the overall operation in the information processing device 1 in accordance with various programs. The CPU 11 may also be a microprocessor. The ROM 12 stores programs, operation parameters and the like used by the CPU 11. The RAM 13 temporarily stores programs used in the execution by the CPU 11, parameters that change appropriately in that execution, and the like. These are connected together by a host bus including a CPU bus or the like. The functions of the image recognition unit 120, the display mode selection unit 130, and the display control unit 140 are realized mainly through software working in cooperation with the CPU 11, the ROM 12, and the RAM 13.

The input device 14 includes inputting means such as a mouse, a keyboard, a touch panel, a button, a microphone, a switch, and a lever, for the user to input information, an input control circuit that generates an input signal on the basis of input by the user, and outputs the generated input signal to the CPU 11, and the like. The user of the information processing device 1 is able to input various kinds of data and direct processing operations with respect to the information processing device 1, by operating the input device 14.

The output device 15 includes a display device such as a liquid crystal display (LCD) device, an OLED device, a see-through display, and a lamp, for example. Furthermore, the output device 15 includes a voice output device such as a speaker and headphones. For example, the display device displays a captured image, a generated image or the like. On the other hand, the voice output device converts voice data and the like into voice, and then outputs the voice. The output device 15 corresponds to the display unit 160 described with reference to FIG. 2.

The storage device 16 is a device for storing data. The storage device 16 may include a storage medium, a recording device that stores data in a storage medium, a readout device that reads out data from a storage medium, a deletion device that deletes data recorded in a storage medium, and the like. The storage device 16 stores programs executed by the CPU 11 and various kinds of data. The storage device 16 corresponds to the storage unit 150 described with reference to FIG. 2.

The imaging device 17 includes an imaging optical system such as a shooting lens which collects light and a zoom lens, and a signal conversion device such as a charge coupled device (CCD) and a complementary metal oxide semiconductor (CMOS). The imaging optical system collects light emitted from a subject to form a subject image at a signal converting unit, and the signal conversion device converts the formed subject image into an electrical image signal. The imaging device 17 corresponds to the imaging unit 110 described with reference to FIG. 2.

The communication device 18 is a communication interface including a communication device for connecting to the communication network, or the like, for example. Also, the communication device 18 may be a wireless local area network (LAN) compatible communication device, a long term evolution (LTE) compliant communication device, a wired communication device that performs communication via a wire, or a Bluetooth communication device.

7. Conclusion

As described above, according to the embodiment of the present disclosure, it is possible to present information to a user in accordance with the visual range of the user and the positional relationship of a real object.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Also, in the embodiment described above, an example is described in which the information processing device 1 that performs the display mode selection process and the display control process is provided with the imaging unit 110, the image recognition unit 120, and the storage unit 150 and the like, but the present technology is not limited to this example. For example, the information processing device that performs the display mode selection process and the display control process may perform the display mode selection process and the display control process by receiving information regarding captured images, image recognition results, and display objects and the like, from another device either directly or over a network or the like.

Further, in the embodiment described above, an example is described in which the number of pieces of content and the number of indications to be displayed are determined in accordance with the first visual field range, the second visual field range, and the positional relationship of a real object, but the present technology is not limited to this example.

For example, in an application in which a large quantity of content can be displayed within the visual field, the maximum number of pieces of content and the maximum number of indications to be displayed may be set. Also, even if a real object exists in the first or second visual field range, the number of pieces of content and the number of indications to be displayed may be limited in accordance with the distance between the user and the real object, or the bearing (angle) from the user to the position of the real object.

According to such a configuration, the user is able to be prevented from becoming confused by a large amount of content or a large amount of indications being displayed.

Also, in the second specific example and the third specific example and the like of the embodiment described above, an example is described in which an indication is displayed at a position corresponding to a position of the content, but if the real object associated with the content moves frequently, it may cause the user to become distracted. Therefore, an indication may be displayed so that the frequency of movement of the displayed indication or the width of the movement or the like is limited to a predetermined value or less so that the user will not easily become distracted.

Also, in a case where a real object moves from outside the superimposition displayable range (second visual field range) to within the superimposition displayable range due to movement of the user or movement of the real object, animation display may be performed so that the user does not lose the connection between the indication and the real object. For example, animation display that crossfades to the content while the indication is enlarged, or animation display in which the content pops up with the indication as the starting point, may be performed. Note that similar animation display may be performed also in a case where a real object moves from within the superimposition displayable range (second visual field range) to outside the superimposition displayable range.

According to such a configuration, the user is able to more easily grasp the connection between an indication and a real object, and the connection between content and a real object, when the display mode is switched.

Note that in the embodiment described above, an example is described in which a range visually recognizable to the user, and a range that is included in the display area and is visually recognizable to the user (a superimposition displayable range) are used as the visual field range, but the present technology is not limited to this example. For example, a range in which a real object can be recognized, such as a range that can be captured by an imaging unit that acquires a captured image, may be used instead of, or in addition to, the range described above.

Also, the respective steps in the embodiment described above do not necessarily have to be performed chronologically in the order illustrated in the flowchart. For example, the respective steps in the process of the embodiment described above may also be performed in a different order than the order illustrated in the flowchart, or they may be performed in parallel.

Also, a computer program for causing the hardware such as the CPU, ROM, RAM and the like built in the information processing device 1 to demonstrate the function of the information processing device 1 described above can also be created. Also, a storage medium that has the computer program stored therein is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing device including:
a display mode selection unit configured to select one display mode from a plurality of display modes in accordance with a first visual field range of a user, a second visual field range included in the first visual field range, and a positional relationship of a real object; and
a display control unit configured to control a display of a virtual object on a display unit in accordance with the selected display mode, the virtual object being associated with the real object.

(2)
The information processing device according to (1), in which
the second visual field range is a range that is included in a display area of the display unit and is visually recognizable to the user.

(3)
The information processing device according to (2), in which
the display mode selection unit selects the display mode in which an indication indicating an existence of content associated with the real object is displayed, in a case where the real object is within the first visual field range but is outside the second visual field range.

(4)
The information processing device according to (3), in which the indication is displayed at a position corresponding to a position of the content.

(5)
The information processing device according to (3) or (4), in which
the indication is displayed at a peripheral edge portion of the display area.

(6)
The information processing device according to any one of (3) to (5), in which
the indication is displayed under a display condition according to a number of pieces of content whose existence is indicated by the indication.

(7)
The information processing device according to any one of (3) to (6), in which
the indication is displayed under a display condition according to a distance from the user or the display area to the position of the content.

(8)
The information processing device according to (6) or (7), in which
the display condition includes a condition relating to at least one of an intensity, luminance, color, number, and size of the indication.

(9)
The information processing device according to any one of (3) to (8), in which
the indication further indicates a bearing from the user toward the position of the content.

(10)

The information processing device according to any one of (3) to (9), in which the indication further indicates a relative position of the content viewed from the user.

(11)

The information processing device according to any one of (3) to (10), in which the indication includes a portion of the content.

(12)

The information processing device according to any one of (3) to (11), in which the indication includes an icon indicating the content.

(13)

The information processing device according to any one of (3) to (12), in which the indication further indicates a direction from the user toward the position of the content.

(14)

The information processing device according to any one of (1) to (13), in which the display mode selection unit selects the display mode in which the virtual object associated with the real object is not displayed, in a case where the real object is outside the first visual field range.

(15)

The information processing device according to any one of (1) to (14), in which the display mode selection unit selects the display mode in which content associated with the real object is displayed, in a case where the real object is within the second visual field range.

(16)

The information processing device according to any one of (1) to (15), in which the first visual field range is a range that is visually recognizable to the user.

(17)

The information processing device according to any one of (1) to (16), further including:

the display unit, in which the display unit is a transmissive display.

(18)

The information processing device according to (17), in which the information processing device is a transmissive HMD.

(19)

An information processing method including:

selecting one display mode from a plurality of display modes, in accordance with a first visual field range of a user, a second visual field range included in the first visual field range, and a positional relationship of a real object; and controlling, by a processor, a display of a virtual object on a display unit in accordance with the selected display mode, the virtual object being associated with the real object.

(20)

A program for causing a computer to realize:

a display mode selection function that selects one display mode from a plurality of display modes in accordance with a first visual field range of a user, a second visual field range included in the first visual field range, and a positional relationship of a real object; and a display control function that controls a display of a virtual object on a display unit in accordance with the selected display mode, the virtual object being associated with the real object.

REFERENCE SIGNS LIST 1 information processing device
110 imaging unit
120 image recognition unit
130 display mode selection unit
140 display control unit
150 storage unit
160 display unit
A12 second visual field range
A14 second visual field range
U1 user

The invention claimed is:

1. An information processing device comprising:
a display mode selection unit configured to select a display mode from a plurality of display modes in accordance with a first visual field range of a user, a second visual field range included in the first visual field range, and a positional relationship of a real object with respect to the first visual field range and the second visual field range; and
a display control unit configured to control a display of a virtual object on a display unit in accordance with the selected display mode, the virtual object being associated with the real object,
wherein in a case where the real object moves between the first visual field range and the second visual field range, the display control unit controls an animation display to switch the selected display mode, and
wherein the display mode selection unit and the display control unit are each implemented via at least one processor.

2. The information processing device according to claim 1, wherein
the second visual field range is included in a display area of the display unit and is visually recognizable to the user.

3. The information processing device according to claim 2, wherein
the display mode selection unit selects the display mode in which an indication indicating an existence of content associated with the real object is displayed, in a case where the real object is within the first visual field range but is outside the second visual field range.

4. The information processing device according to claim 3, wherein
the indication is displayed at a position corresponding to a position of the content.

5. The information processing device according to claim 3, wherein
the indication is displayed at a peripheral edge portion of the display area.

6. The information processing device according to claim 3, wherein
the indication is displayed under a display condition according to a number of pieces of content whose existence is indicated by the indication.

7. The information processing device according to claim 3, wherein
the indication is displayed under a display condition according to a distance from the user or the display area to the position of the content.

8. The information processing device according to claim 6, wherein
the display condition includes a condition relating to at least one of an intensity, luminance, color, number, or size of the indication.

9. The information processing device according to claim 3, wherein
the indication further indicates a bearing from the user toward the position of the content.

10. The information processing device according to claim 3, wherein
the indication further indicates a relative position of the content viewed from the user.

11. The information processing device according to claim 3, wherein
the indication includes a portion of the content.

12. The information processing device according to claim 3, wherein
the indication includes an icon indicating the content.

13. The information processing device according to claim 3, wherein
the indication further indicates a direction from the user toward the position of the content.

14. The information processing device according to claim 1, wherein
the display mode selection unit selects the display mode in which the virtual object associated with the real object is not displayed, in a case where the real object is outside the first visual field range.

15. The information processing device according to claim 1, wherein
the display mode selection unit selects the display mode in which content associated with the real object is displayed, in a case where the real object is within the second visual field range.

16. The information processing device according to claim 1, wherein
the first visual field range is a range that is visually recognizable to the user.

17. The information processing device according to claim 1, further comprising:
the display unit, wherein
the display unit is a transmissive display.

18. The information processing device according to claim 17, wherein
the information processing device is a transmissive HMD.

19. An information processing method comprising:
selecting a display mode from a plurality of display modes, in accordance with a first visual field range of a user, a second visual field range included in the first visual field range, and a positional relationship of a real object with respect to the first visual field range and the second visual field range; and
controlling, by a processor, a display of a virtual object on a display unit in accordance with the selected display mode, the virtual object being associated with the real object,
wherein in a case where the real object moves between the first visual field range and the second visual field range, the display control unit controls an animation display to switch the selected display mode.

20. A non-transitory computer-readable medium having embodied thereon a program, which when executed by a computer causes the computer to execute a method, the method comprising:
selecting a display mode from a plurality of display modes in accordance with a first visual field range of a user, a second visual field range included in the first visual field range, and a positional relationship of a real object with respect to the first visual field range and the second visual field range; and
controlling a display of a virtual object on a display unit in accordance with the selected display mode, the virtual object being associated with the real object,
wherein in a case where the real object moves between the first visual field range and the second visual field range, the display control unit controls an animation display to switch the selected display mode.

* * * * *